United States Patent Office 3,443,821
Patented May 13, 1969

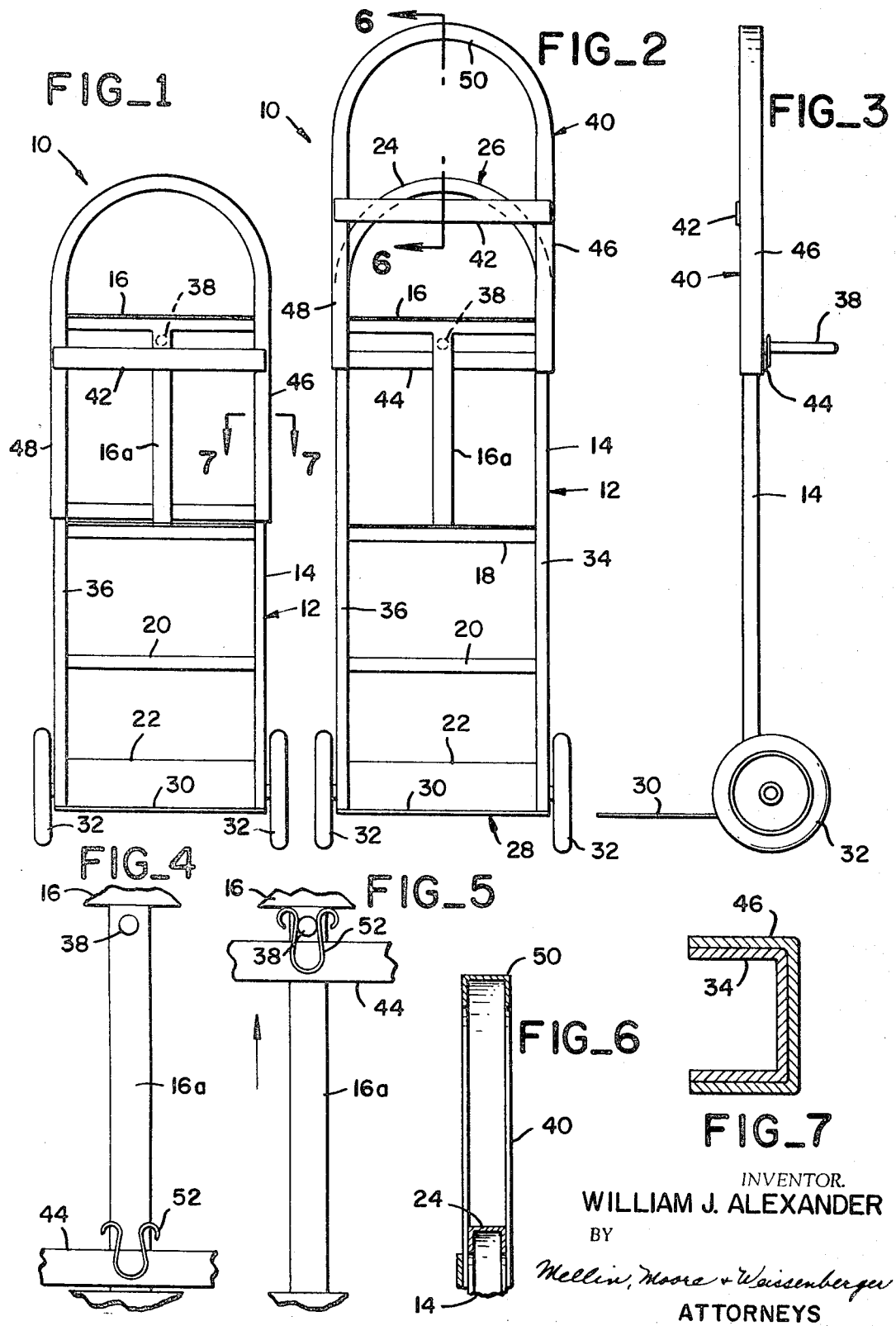

3,443,821
HAND TRUCK WITH EXTENDABLE BODY
William J. Alexander, Castro Valley, Calif.
(2679 Cresta Verde, Camino, Calif. 95709)
Filed Aug. 28, 1967, Ser. No. 663,852
Int. Cl. B62d 21/14, 21/18; B60p 1/04
U.S. Cl. 280—34                                    4 Claims

ABSTRACT OF THE DISCLOSURE

A hand truck having a frame which includes a pair of parallel frame members, a platform held relative to the frame near one end thereof, a pair of wheels held near the platform on which the truck is rollable, a handle fixed to the frame, a member extendable from the frame along the parallel frame members, and a spring clip fixed to the extendable member and adapted to receive and releasably hold the handle when the extendable member is extended.

Beyond of the invention

This invention relates to hand trucks and, more particularly, to a hand truck having a member which is extendable from the frame of the truck to increase volume-carrying capacity thereof.

Various hand trucks with members extendable from the body thereof are known (for example, Chenette 2,277,302, Howard 2,582,435, and French Patent 613,325). However, French Patent 613,325 and Chenette 2,277,302 are mainly concerned with providing extendable handles which are not primarily intended to be load-carrying members. Furthermore, Chenette 2,277,302 provides openings through which pins fit to hold the adjustable members in place. Adjustment of these members requires removal of pins, alignment of openings, and replacement of pins, a relatively elaborate procedure. Howard (2,582,435) provides a quite complicated structure for holding the adjustable member in place, this complication, of course, leading to other problems, such as possible sticking of parts, difficulty of repair in case of breakdown, or the like.

It is an object of this invention to overcome the above problems by providing a hand truck having a load-carrying extendable member and being extremely simple in design and smooth in operation.

It is a further object of the invention to provide a hand truck having an extendable member which may be extended or retracted in the simplest manner, the hand truck requiring no complicated device for holding the extending member in its extended position.

Summary of the invention

Broadly stated, applicant's hand truck comprises a frame including a pair of spaced, parallel frame members and defining a pair of frame ends, a platform held relative to the frame adjacent one end thereof, a pair of wheels rotatably held relative to the frame adjacent the platform, a handle fixed to and extending from the frame intermediate the frame ends, a member extendable from the other end of the frame along the parallel frame members, and means fixed to the extendable member adapted to cooperate with the handle to limit the extendsion of the member from the other end of the frame and selectively hold the extendable member in an extended position relative to the frame.

Brief description of the drawings

A preferred embodiment of the invention is included, wherein
FIG. 1 is a front elevation of the device showing the extendable member in a non-extended position;
FIG. 2 is similar to FIG. 1 but with the extendable member in an extended position;
FIG. 3 is a side elevation of the device;
FIG. 4 is a fragmentary view of the handle and spring clip of the device with the extendable members in a non-extended positions;
FIG. 5 is similar to FIG. 4 but with the extendable member in an extended position;
FIG. 6 is a section taken along the line 6—6 of FIG. 2;
FIG. 7 is a section taken along the line 7—7 of FIG. 1.

Description of the preferred embodiment

Referring to FIGS. 1, 2 and 3, a hand truck is shown generally at 10. The hand truck 10 has a frame 12 which is made up of a U-shaped member 14 and braces 16, 16a, 18, 20 and 22. The arcuate portion 24 of the frame member 14 forms a first frame end 26 and the open end of the frame member 14 (where it is braced by brace 22) forms a second frame end 28. A platform 30 is held relative to the frame 12 adjacent its second end 28. A pair of wheels 32 are rotatably held relative to the frame 12 adjacent the platform 30. Extending from brace 16a of frame 12 at a point substantially equidistant from the parallel legs 34, 36 of the U-shaped frame member 14, and at a point intermediate the frame ends 26 and 28, is a handle 28. It will be noted (FIGS. 6 and 7) that U-shaped frame member 14 is channel-like in cross section.

A substantially U-shaped member 40, also channel-like in cross section (FIG. 7) and braced by braces 42, 44 is best shown in FIGS. 1 and 2. The parallel legs 46, 48 thereof of slidably fit over the parallel legs 34, 36, respectively, of the U-shaped frame member 14. The U-shaped member 40 is thus extendable from the first frame end 26. Because of the channel-like cross section of the extendable member 40, the arcuate portion 50 thereof is adapted to fit over the arcuate portion 24 of the U-shaped frame member 14 when the extendable member 40 is in a non-extended state (FIG. 1). This state is viewed from the opposite side of the hand truck 10 in FIG. 4. Shown therein is handle 38 fixed to brace 16a, and spring clip 52 fixed to brace 44 of extendable member 40. As the extendable member 40 is extended (by sliding the parallel legs 46, 48 thereof over the parallel legs 34, 36 of the U-shaped frame member 14), the spring clip 52 moves therewith and receives the handle 38 (FIG. 5). It will be seen that as extendable member 40 is extended, the legs of the spring clip 52 are spread by the handle 38, and when the handle 38 is seated thereon, the legs of the spring clip 52 act to hold the handle 38 therein. This in turn serves to hold the extendable member 40 in an extended position. The spring clip 52, and brace 44) act also to limit the extension of extendable member 40. This state is shown in FIG. 2.

When it is desired that the extendable member 40 be returned to its non-extended position (FIG. 1), it need only be given a sharp blow thereon, sufficient to overcome the force in spring clip 52, and the extendable member 40 may be slid to its non-extended position.

As shown most clearly in FIG. 2, when the extendable member 40 is extended, the arcuate portion 24 of the U-shaped frame member remains in position relative to parallel legs 34, 36. This insures that there is no weakening of the basic frame structure of the device, and that a full load can be carried thereon just as if the extendable member 40 was not extended. The load-carrying strength and capacity of the U-shaped frame member 14 itself are not impaired when the extendable member 40 is extended.

It is to be noted that the brace 44 is on the back side of the extendable member 40, and the brace 42 is on the front side thereof. These braces are properly positioned to solidly support a load which may be placed on the extendable member 40 when it is in an extended position.

Thus the extendable member itself is also capable of carrying a full load. Applicant has thus provided a hand truck the load-carrying back portion of which is extendable. Due to the cooperation of the spring clip 52 with the handle 38, a high degree of simplicity is achieved. No complicated structure for holding the extendable member extended is needed, the extension thereof being an extremely simple task. Furthermore, because of the positioning of the handle 38 and spring clip 52 intermediate the legs which slide over one another, smooth operation of the extendable member (i.e., no binding of the legs slidable on one another) is assured.

Obviously, the invention can be carried out in many different ways, of which the embodiment shown and described is merely illustrative. Therefore, I do not wish to be limited to the embodiment shown and described, but only by the following claims.

I claim:
1. A hand truck comprising:
   (a) a frame including a pair of spaced, parallel frame members and defining a pair of frame ends;
   (b) a handle fixed to the frame substantially equidistant from each parallel frame member;
   (c) a pair of wheels rotatably held relative to the frame adjacent the platform;
   (d) a handle fixed to and extending from the frame intermediate the frame ends;
   (e) a member extendable from the other end of the frame along the parallel frame members; and
   (f) means fixed to the extendable member adapted to cooperate with the handle to limit the extension of the members from the other end of the frame and selectively hold the extendable member in an extended position relative to the frame.

2. A hand truck according to claim 1 wherein the frame has a frame portion connecting the parallel frame members at the other end thereof, said connecting portion remaining in position relative to the parallel frame members when the extendable member is extended from the other end of the frame.

3. A hand truck according to claim 2 wherein the means adapted to cooperate with the handle comprises a spring clip adapted to receive and releasably hold the handle when the extendable member is extended.

4. A hand truck comprising:
   (a) a frame including a substantially U-shaped frame member the arcuate portion of which forms a first frame end and the open end of which forms a second frame end;
   (b) a platform held relative to the frame adjacent its second end;
   (c) a pair of wheels rotatably held relative to the frame adjacent the platform;
   (d) a handle fixed to the frame substantially equidistant from the parallel legs of the U-shaped frame member;
   (e) a substantially U-shaped member the parallel legs of which slidably fit over the parallel legs of the substantially U-shaped frame member, and the arcuate portion of which is fittable over the arcuate portion of the substantially U-shaped frame member; whereby the substantially U-shaped member is extendable from the first frame end; and
   (f) a spring clip fixed to the substantially U-shaped member and adapted to receive and releasably hold the handle when the substantially U-shaped member is extended.

References Cited
UNITED STATES PATENTS

| | | | |
|---|---|---|---|
| 733,889 | 7/1903 | Wolfskill | 280—34.3 |
| 2,277,302 | 3/1942 | Chenette | 280—34.2 |
| 2,497,440 | 2/1950 | Denny | 280—34.2 |

LEO FRIAGLIA, *Primary Examiner.*

JOEL E. SIEGEL, *Assistant Examiner.*